(12) United States Patent
Rueping et al.

(10) Patent No.: US 8,180,816 B2
(45) Date of Patent: May 15, 2012

(54) CONTROL OF A PSEUDO RANDOM NUMBER GENERATOR AND A CONSUMER CIRCUIT COUPLED THERETO

(75) Inventors: Stefan Rueping, Lengdorf (DE); Rainer Goettfert, Taufkirchen (DE)

(73) Assignee: Infineon Technologies AG, Neubiberg (DE)

( * ) Notice: Subject to any disclaimer, the term of this patent is extended or adjusted under 35 U.S.C. 154(b) by 1147 days.

(21) Appl. No.: 11/948,108

(22) Filed: Nov. 30, 2007

(65) Prior Publication Data
US 2009/0144351 A1    Jun. 4, 2009

(51) Int. Cl.
*G06F 1/02* (2006.01)
(52) U.S. Cl. ........................... 708/250; 708/255
(58) Field of Classification Search ........... 708/250–256
See application file for complete search history.

(56) References Cited

U.S. PATENT DOCUMENTS

| | | | |
|---|---|---|---|
| 7,424,500 B2 * | 9/2008 | Fukushima et al. | 708/251 |
| 2002/0156819 A1 | 10/2002 | Oerlemans | |
| 2004/0039762 A1 * | 2/2004 | Hars | 708/255 |
| 2004/0193664 A1 * | 9/2004 | Shimasaki | 708/252 |
| 2005/0129247 A1 * | 6/2005 | Gammel et al. | 380/286 |
| 2007/0140485 A1 * | 6/2007 | Ghigo et al. | 380/46 |
| 2008/0270503 A1 * | 10/2008 | Nilsson et al. | 708/255 |

* cited by examiner

*Primary Examiner* — Tan Mai
(74) *Attorney, Agent, or Firm* — Dickstein Shapiro LLP

(57) ABSTRACT

A system having a pseudo random number generator, a control circuit being configured to increase a quality of a pseudo random number output signal of the pseudo random number generator by coupling the pseudo random number generator with a true random number output signal of a true random number generator and a consumer circuit being configured to use the pseudo random number output signal before and after the increase.

25 Claims, 7 Drawing Sheets

US 8,180,816 B2

CONTROL OF A PSEUDO RANDOM NUMBER GENERATOR AND A CONSUMER CIRCUIT COUPLED THERETO

TECHNICAL BACKGROUND

The present invention relates to controlling a pseudo random number generator and a consumer circuit coupled thereto.

Pseudo random number generators (PRNG) output a sequence of pseudo random numbers, the quality of which depends on the amount of true randomness, and/or the amount of true random number data input into the pseudo random generator. In other words, it is necessary to input enough true random number data into the pseudo random number generator in order to obtain pseudo random numbers of requested quality. A true random number generator (TRNG) may be used in order to generate the true random number data.

BRIEF DESCRIPTION OF THE DRAWINGS

Embodiments of the present invention are described in the following with respect to the figures among which.

DETAILED DESCRIPTION

Within the figures, equal elements or elements of equal functionality are indicated by equal or similar reference signs, and descriptions regarding the elements presented relating to preceding figures are not repeated within the description of succeeding figures.

Figure 1A:
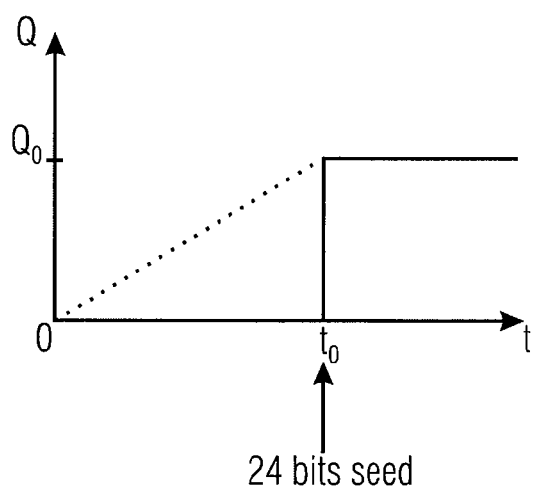
FIGS. 1a and 1b show graphs plotting the quality of the pseudo random number output signal versus time for different seeding sceneries.
Figure 1B:
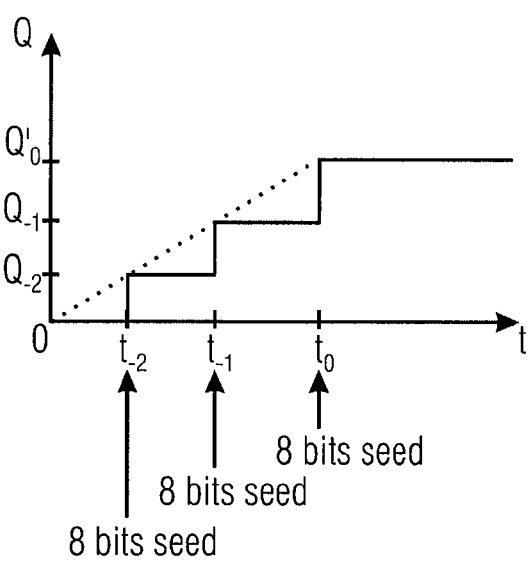

FIGS. 1a and 1b show different possibilities of seeding a pseudo random number generator. In the case of FIG. 1a, the pseudo random generator is exemplarily seeded with 24 bits of true random number data until a time instant $t_0$. From this time instant onwards, the quality of the pseudo random number output signal of the pseudo random number generator assumes a value of $Q_0$. For example, the seeding with the 24 true random number bits takes place continuously during a time period of consecutive clock cycles of the pseudo random number generator, the time period ending at the time instant $t_0$.

In comparison thereto, FIG. 1b shows the quality Q of the pseudo random number output signal of the pseudo random number generator versus time t in case of seeding the pseudo random number generator intermittently at more than one time instance. In FIG. 1b, exemplarily, three time instants $t_{-2}$, $t_{-1}$ and $t_0$ are shown. In the time intervals between time instants $t_{-2}$, $t_{-1}$, and $t_0$, the pseudo random number generator may operate in a free-running mode, i.e. uninfluenced by true random number data. At each time instant $t_{-2}$, $t_{-1}$, and $t_0$, the pseudo random number generator is exemplarily seeded with 8 bits of true random number data. Accordingly, as indicated in FIG. 1b, the pseudo random generator provides a pseudo random number output signal of increasing quality $Q_{-2}$, $Q_{-1}$, and $Q_0'$.

Comparing the sceneries of FIGS. 1a and 1b, it becomes clear that from time instant $t_0$ on, i.e., the time the true random number generator needs in order to generate 24 bits of true random number data from, for example, a powering-on of the true random number generator, the pseudo random number generator provides, in a free-running mode, pseudo random number data of equal or similar quality $Q_0$ and $Q_0'$, respectively. However, in case of the seeding scenery of FIG. 1b, it is possible to use the pseudo random number output signal before time instant $t_0$. For example, before time instant $t_0$, the pseudo random number output signal output by the pseudo random number generator may be used for tasks not requiring the full quality $Q_0$ or $Q_0'$ which, in turn, is provided after time instant $t_0$.

Before describing the following embodiments, it has to be noted that the examples of FIGS. 1a and 1b were of an illustrative nature only. This is especially true for the number of bits used for the individual seeding steps exemplarily indicated in FIGS. 1a and 1b. However, this simplification is also true for the steepness of the quality increase at the individual time instants $t_0$, $t_{-1}$, and $t_{-2}$, respectively. In other words, while FIGS. 1a and 1b suggest that the quality of the pseudo random number output signal increases instantaneously upon seeding with a plurality of bits, the individual seed steps may be performed such that the quality increase results in a gradual increase of the quality. For example, FIG. 1a shows with a dotted line a gradual increase in quality of the pseudo random number output signal from time 0 to time instant $t_0$, resulting in quality $Q_0$ at time instant $t_0$. FIG. 1b shows a similar gradual increase from time instant 0 to time instant $t_0$, with the quality gradually increasing from 0 to $Q_0'$. In this case, the difference between both seeding sceneries is that the pseudo random number output signal in the case of FIG. 1a is used after time instant $t_0$ only, whereas the pseudo random number output signal of the pseudo random number generator is also used before time instant $t_0$, thereby enabling an earlier performance of tasks not requiring the full quality $Q_0'$.

Figure 2:
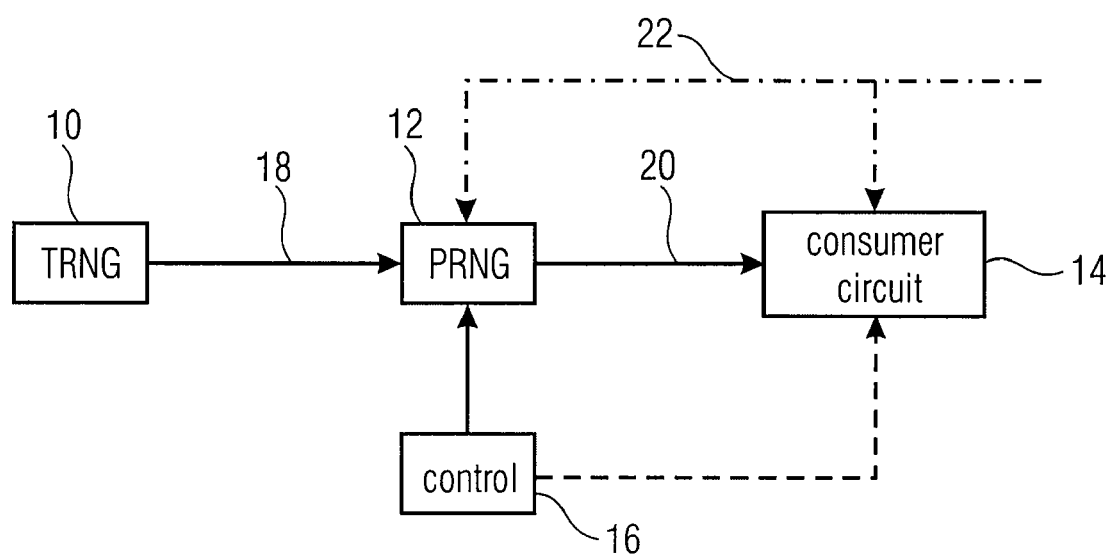
FIG. 2 shows a block diagram of a circuitry comprising a pseudo random number generator controlled according to an embodiment.

FIG. 2 shows a circuitry comprising a true random number generator 10, a pseudo random number generator 12, a consumer circuit 14, and a control 16, with the pseudo random number generator 12 serially connected between the true random number generator 10 and the consumer circuit 14 and the control 16 being coupled to the pseudo random number generator 12.

The true random number generator 10 generates and outputs a true random number output signal 18. As described later in more detail with respect to FIG. 6, the true random number generator 10 may comprise a physical noise source to generate the true random number output signal 18. The true random number output signal 18 may be a sequence of bits regularly spaced apart in time. However, it is also possible that the true random number generator 10 generates and outputs the true random number output signal 18 intermittently in groups of bits, regularly or irregularly spaced apart in time, and with the groups being equally in size or not.

The pseudo random number generator 12 may comprise a feedback shift register as it is described in more detail below with respect to FIGS. 7 and 8. The pseudo random generator 12 generates and outputs a pseudo random number output signal 20. The pseudo random number output signal 20 may be a sequence of bits consecutively output by the pseudo random number generator 12 in consecutive clock cycles of a clock 22 by which the pseudo random number 12 is clocked. In particular, the rate at which the pseudo random number generator 12 generates and outputs the pseudo random number output signal 20 may be greater than the rate at which the true random number generator 10 generates and outputs the true random number output signal 18.

The pseudo random number generator 12 is controllable to operate in a seeded mode or free-running mode. In the seeded mode, the pseudo random number generator 12 is coupled with the true random number output signal 18 so that its internal state is influenced by the true random number output signal 18, and so that a quality of the pseudo random number output signal 20 increases due to an increase of uncertainty introduced into the internal state of the pseudo random number generator 12 by means of the true random number output signal 18. In the free-running mode, the pseudo random number generator 12 is decoupled from the true random output signal 18 so that its internal state is not influenced by the true random number output signal 18. During the free-running mode, the quality of the pseudo random number output signal 20 stagnates and the pseudo random number generator keeps on outputting PRNG data.

The control 16 controls the pseudo random number generator 12 to operate in the free-running mode or seeded mode. In other words, control 16 is for increasing the quality of the pseudo random number output signal of the pseudo random number generator 12. Further details in this regard are set out below.

The consumer circuit 14 is configured to use the pseudo random number output signal 20. The consumer circuit 14, an embodiment of which is set out in more detail below with respect to FIG. 3, may comprise a cryptographic circuit such as an encipher or decipher. Alternatively, the consumer circuit 14 comprises a non-cryptographic circuit such as a transmission circuit for data communication with an external device. According to an even further embodiment, the consumer circuit 14 may comprise different consumer entities responsible for different consumer tasks necessitating the use of the pseudo random number output signal 20 for its performance.

In particular, as will be described in more detail below, the consumer circuit 14 is configured to use the pseudo random number output signal 20 before and after an increase of the quality of the pseudo random number output signal 20, as caused by control 16, and coupling the pseudo random number generator 12 with the true random number output signal 18. To this end, the consumer circuit 14 may be implemented such that the consumer circuit 14 uses pseudo random number output signal 20 before and after the increase. For example, the consumer circuit 14 may perform a first task requiring less quality of the pseudo random number output signal 20 before the increase and may start performing a second task requiring a higher level of pseudo random number quality after the increase. To ensure that the consumer circuit 14 starts using the second task merely after the increase, control 16 may implement a respective function in order to commence the performance of the second task by consumer circuit 14, or the consumer circuit 14 may be implemented in a way that the performance of the second task starts in any case after the increase.

Although not necessary, in order to ensure that the time of starting the performance of the second task lies after the increase in the quality so that the quality of the pseudo random number output 20 complies with the requested quality of the second task, the consumer circuit 14 may receive the clock 22 and start the performance of the second task depending on this clock 22. According to a further embodiment, the consumer circuit 14 may not be controlled by control 16, but may be informed by control 16 of the increase in the pseudo random number output signal quality by coupling the pseudo random number generator 12 with the true random output signal 18, in order to be able to decide on respective requests for performing a task depending on the current quality in comparison to the quality requested by the respective task. The latter possibility will be described in more detail below with respect to FIG. 4.

The circuitry of FIG. 2 may be implemented within a chip card or cryptographic controller for use within a chip card or smart card. Further, the consumer circuit 14 is not restricted to the abovementioned embodiments. Rather, the consumer circuit 14 may involve circuits using the pseudo random number output signal 20 for the purpose of masking internal signals, randomizing internal signals, or randomizing a power consumption in order to counter correlation attacks such as differential fault attacks.

Figure 3:
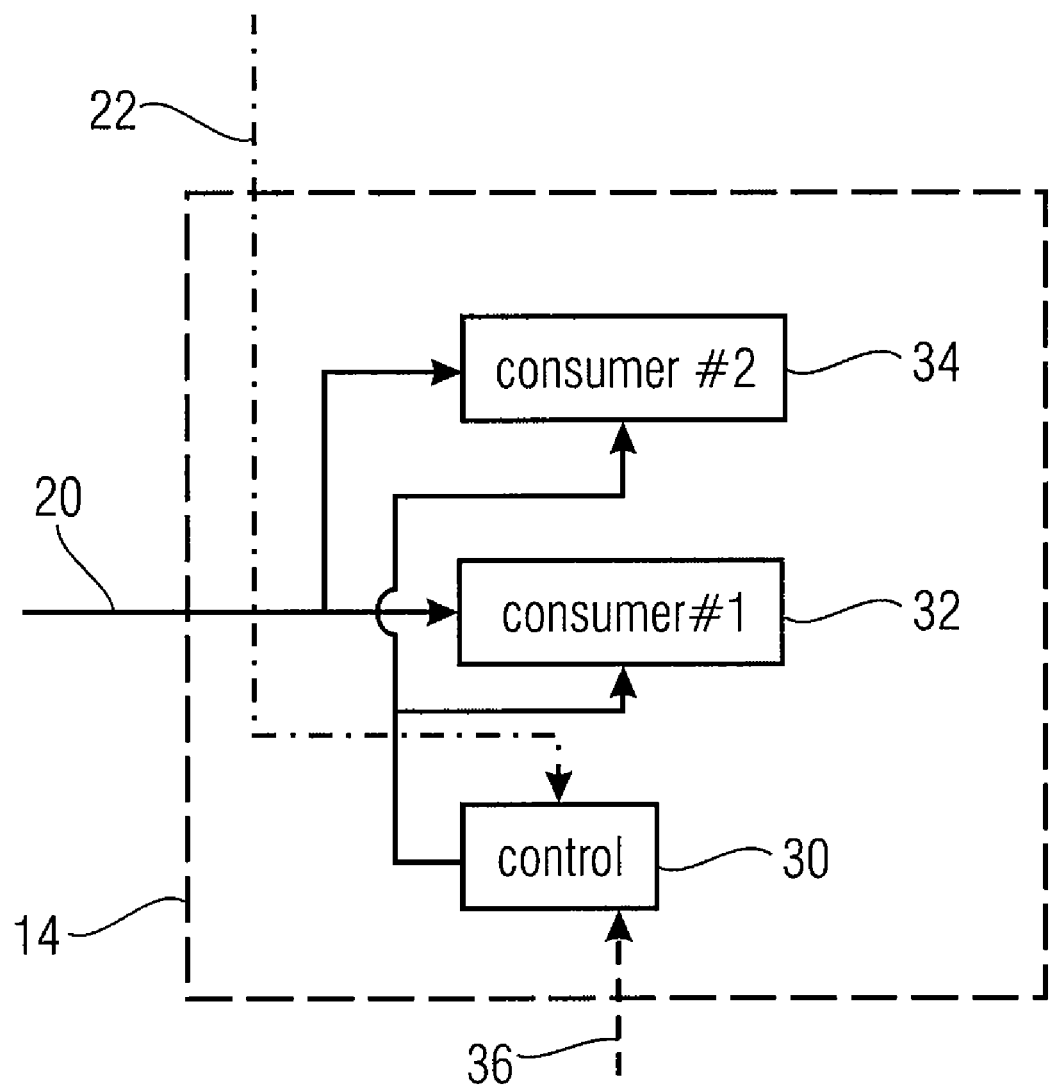
FIG. 3 shows a block diagram of a consumer circuit of FIG. 2, according to an embodiment.

FIG. 3 shows an exemplarily embodiment for the consumer circuit 14. According to FIG. 3, the consumer circuit 14 comprises a control 30, a first consumer 32, and a second consumer 34. Control 30 may comprise a central processing unit or may be hardwired or may even be implemented as a field programmable array. Consumers 32 and 34 may be co-processors, or may be different programs or applications. The consumers 32 and 34 are configured to perform different tasks. When performing the different tasks, consumers 32 and 34 use the pseudo random number output signal 20. Exemplarily, consumer 34 requires a higher degree of quality of the pseudo random number output signal 20 than consumer 32. Control 30 controls consumers 32 and 34. In particular, control 30 controls consumers 32 and 34 such that consumer 32 starts performing its task merely after the time the quality of the pseudo random number output signal 20 exceeds or at least reaches the quality required by the task performed by consumer 34, while consumer 32 starts performing its task before this time.

For example, control 30 may be a central processing unit while consumers 32 and 34 are co-processors and/or software routines commenceable by central processing unit 30 upon receipt of respective program instructions. The central processing unit 30 may execute various programs. In executing these programs, the central processing unit 30 may receive instructions or requests to perform the task of consumer 34 or the task of consumer 32, and thus to commence consumer 34 or consumer 32. Upon receipt of such an instruction, the central processing unit 30 checks as to whether the current quality of the pseudo random number output signal 20 meets the requirement regarding the quality raised by the respective task in order to determine as to whether the respective consumer 32 or 34, may be started or not. The control 30 may derive the current quality based on a time period passed since a powering-up of the true random number generator 10, or based on a number of clock cycles of clock 22. Alternatively, control 30 may derive the quality from a respective signal received from control 16 as indicated by the dashed arrow 36. For example, control 16 increments an index 36 each time, or during the pseudo random number generator 12 is coupled to the true random number output signal 18.

Alternatively, control 30 is hardwired and unconditionally initiates consumers 32 and 34 so that, for example, each consumer starts as early as possible, i.e., as soon as the current quality of the pseudo random number output signal 20 exceeds or reaches the quality required by the respective consumer 32 and 34, respectively. In this instance, the control 30 may also be configured as a programmable gate array. Thus implemented, the control 30 may operate depending on the signal 36 on clock 22 in order to appropriately initiate consumers 32 and 34, respectively.

Even alternatively, control 30 is hardwired on a programmable gate array and receives request signals from consumers 32 and 34 also implemented as a hardwired circuitry or field programmable array, and activates the respective consumers 32 and 34 by means of respective enable signals at the above-mentioned times—that is, when the quality of the pseudo random number output signal 20 has reached or exceeded the respective quality required by the respective consumer 32 and 34, respectively. Only when enabled, the respective consumer 32 and 34, respectively, begins to perform its respective task.

Figure 4:
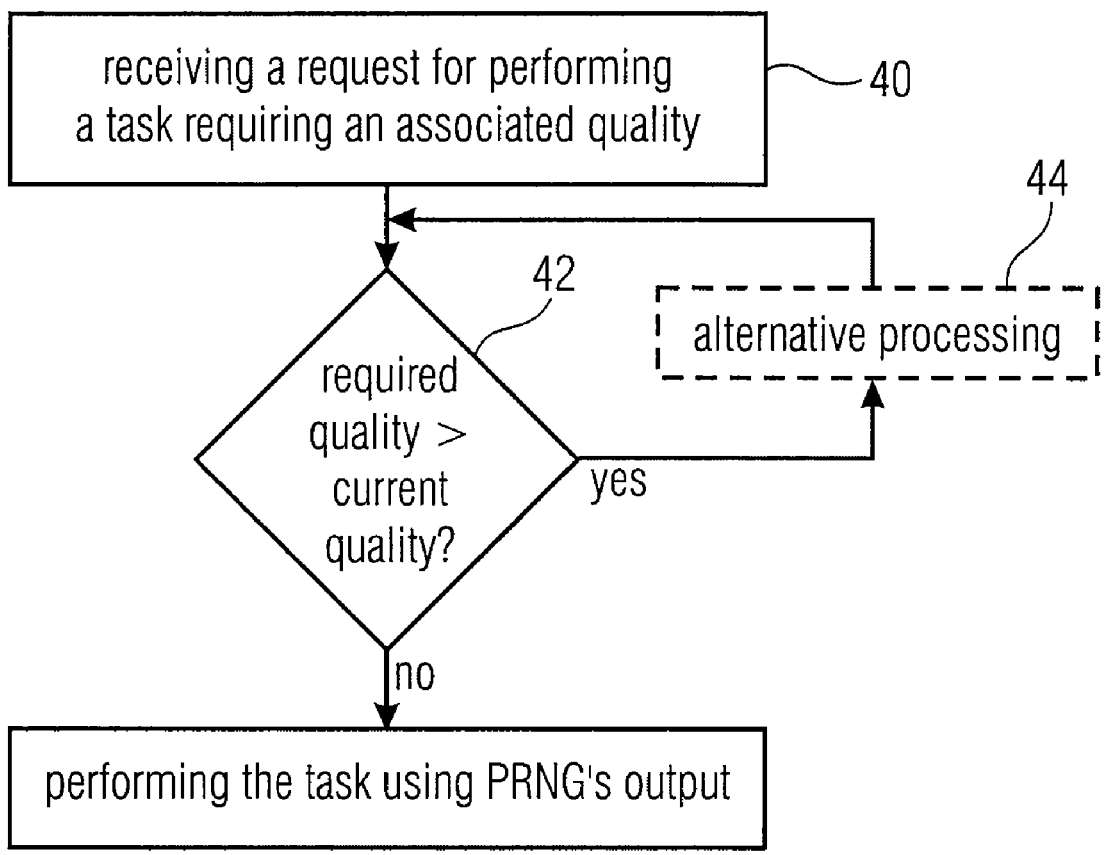
FIG. 4 shows a flow diagram for illustrating a mode of operation of the control of FIG. 3 according to an embodiment.

FIG. 4 shows an example for steps performed within control 30 of FIG. 3, in the case of control 30 acting as a means for processing requests for performing respective tasks. Although FIG. 4 shows the exemplary mode of operation of control 30 by way of functional steps, it is noted that the functional steps shown in FIG. 4 may be implemented as respective circuit parts, sub-routines or the like so that FIG. 4 may also be viewed as showing means to perform the respective functions shown in the blocks of FIG. 4, with these means being implemented within control 30.

The process shown in FIG. 4 starts at step 40 where control 30 receives a request for performing a task requiring an associated quality. In particular, control 30 may receive the request for performing a task requiring an associated quality from a software application. The task requested to be performed may be some differential power attack counter measure, some masking or some enciphering or deciphering. The quality required may be associated to the task to be performed according to the request and/or may be associated to the requesting entity.

For example, in case of the circuitry of FIG. 2 being included in a multi-application chip card, the request in step 40 could stem from one of a plurality of different applications such as an electronic cash application, a public transport ticket payment application, or the like. All these applications could be associated with different security levels. Nevertheless, it could be that some of these applications with different security levels request the performance of a common task. In this case, an application associated with the higher security may require the task to be performed using a higher quality of the pseudo random number output signal than the other application. Referring to FIG. 3, in this case these applications of different security levels have to be interpreted as the consumers in FIG. 3 with both consumers performing the same task but with different demands on the amount of quality of the pseudo random number output signal.

Next, in step 42, control 30 compares the required quality with the current quality. As already described above, control 30 may derive the current quality from information received from control 16. Further, it is possible that the control 30 sets the current quality or derives the current quality based on an appropriate time basis, such as, for example, based on the time or the number of clock cycles passed or occurring since a powering-up of the true random number generator 10, wherein the number of clocks may be referred to clock 22 by means of which the pseudo random number generator 12 is clocked.

If the comparison in step 42 reveals that the required quality is greater than the current quality, control 30 may await the time at which the pseudo random number output signal's quality reaches or exceeds the required quality by waiting, by simply repeating step 42. Alternatively, as indicated by the dashed box in FIG. 4, control 30 may perform an alternative processing 44, such as commencing of other tasks than requested in step 40, whereinafter the process of FIG. 4 steps back to step 42 again.

However, if the current quality is equal to or greater than the required quality, then control circuit 30 causes the performance of the task using the pseudo random number output signal 20.

In the following, different sceneries of seeding and task performances which are possible with the above-mentioned embodiments are described with respect to FIGS. 5a and 5b. In both figures, braces are used in order to indicate the time period during which a respective seeding of the pseudo random number generator 12 (FIG. 2) or a performance of the respective task by one of the consumers 32 and 34, respectively (FIG. 3) takes place.

Figure 5A:
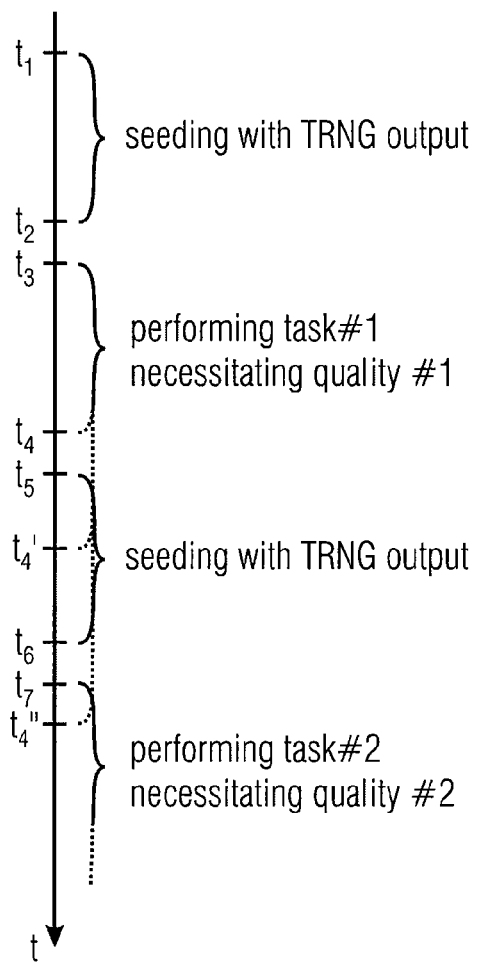
FIGS. 5a and 5b schematically show seeding sceneries with different timing possibly used with the circuitry of FIG. 2.
Figure 5B:
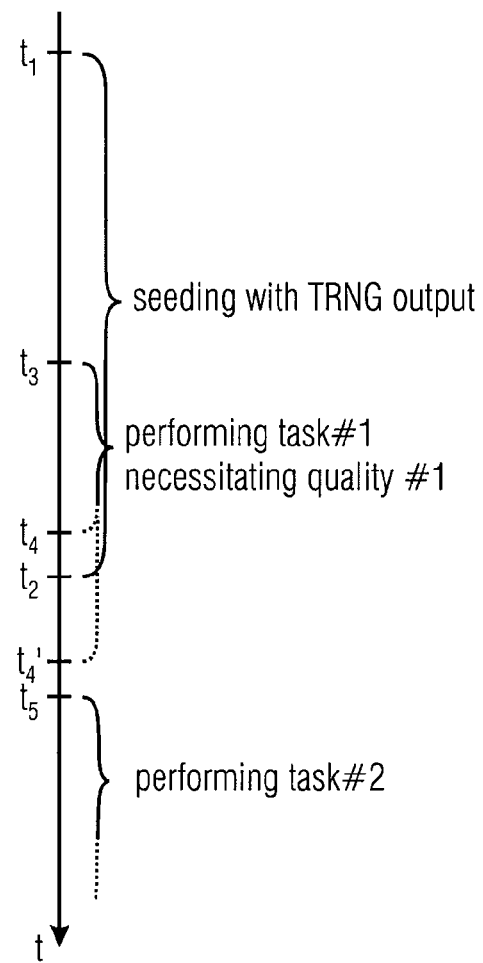

In FIGS. 5a and 5b, it is assumed that the seeding process of seeding the pseudo random number generator 12 with the true random number output signal 18 (see FIG. 2), is not an instantaneous process, i.e., a process that merely takes one pseudo random number clock cycle. Rather, it is assumed that the seeding process or the seeding steps extend over several consecutive clock cycles. However, as already noted with respect to FIGS. 1a and 1b, it is also possible that the seeding steps are executed within one clock cycle.

FIG. 5a shows and example where the pseudo random number generator is seeded within time interval $[t_1, t_2]$ whereupon the performance of a first task, namely task#1, is started at the time instant $t_3 \geq t_2$ equal to or separated in time from time instant $t_2$. A second seeding step is performed during time interval $[t_5, t_6]$. Later, i.e., at a time instant $t_7 > t_6$, the performance of a second task, namely task#2, is started. Both tasks, i.e., task#1 and task#2 use the pseudo random number output signal. Thus, in FIG. 5a, the pseudo random number output signal is used before and after the increase of the pseudo random number output signal's quality upon the seeding within time interval $[t_5, t_6]$. Further, provided that the pseudo random number output signal's quality after time instant $t_2$ is high enough or equal to, or higher than the quality necessitated by task#1 and the quality of the pseudo random number output signal after time instant $t_6$ is equal to or greater than the quality necessitated by the second task, task#2, all safety requirements and thus, demands on the pseudo random number output signal's quality are met.

For sake of completeness only, it is noted that the end of the performance of the first task, namely task#1 may occur before time instant $t_5$ (see $t_4$), during the seeding step $[t_5, t_6]$ (see $t_4'$), or after the second seeding step, i.e., after time instant $t_6$ (see $t_4''$).

FIG. 5b shows an example where the pseudo random number generator is continuously seeded during a time interval $t_1$ to $t_2$, i.e. $[t_1, t_2]$. As described with respect to FIGS. 1a and 1b, the pseudo random number output signal's quality gradually increases during this time interval. The performance of the first task, task#1 is started at a time instant $t_3 > t_1$. The performance of a second task, task#2 is initiated at a time instant $t_5 > t_2$. Again, both tasks, i.e., task#1 and task#2, use the pseudo random number output signal. Similarly to the case of FIG. 5a, the pseudo random number output signal is used before and after the increase in the quality of the pseudo random number output signal upon the seeding taking place during time interval ranging from $t_3$ to $t_2$ ($t_2 > t_3 > t_1$). Again, for the sake of completeness only, it is noted that the end of the performance of the first task may fall within the seeding time interval $[t_1, t_2]$, or may occur after this time interval (see $t_4$ or $t_4'$).

Figure 6:
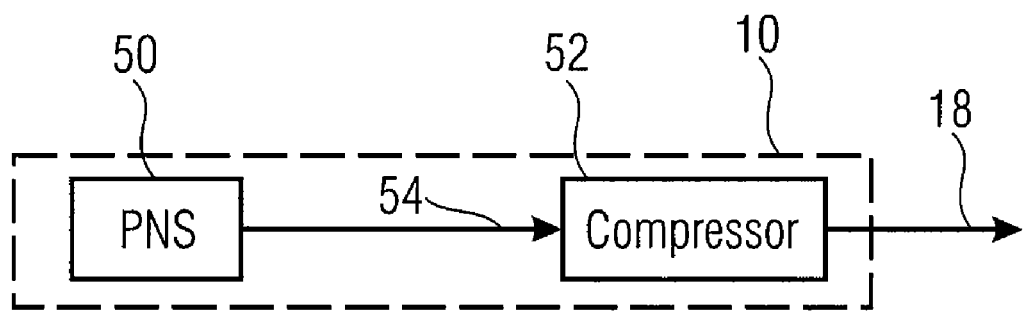
FIG. 6 is a block diagram of an embodiment for the true random number generator of FIG. 2.

FIG. 6 shows an example for a true random number generator that may be used in FIG. 2. In particular, the true random number generator of FIG. 6 comprises a physical noise source 50 and a compressor 52. The physical noise source 50 may be based on a phased locked loop and outputs a noisy sequence of bits 54. Compressor 52 may comprise a feedback shift register and is for enhancing the randomness properties of the noisy sequence of bits 54 to obtain at its output the true random number output signal 18. To this end, compressor 52 outputs the true random number output signal 18 at a rate smaller than the noisy sequence of bits 54 passed from the physical noise source 50 to compressor 52, thereby somehow "compressing" sequence 54. The physical noise source 50 and compressor 52 may be configured such that they are activatable and de-activatable merely in combination so that, in other words, neither of these two entities may run without the other.

Figure 7:
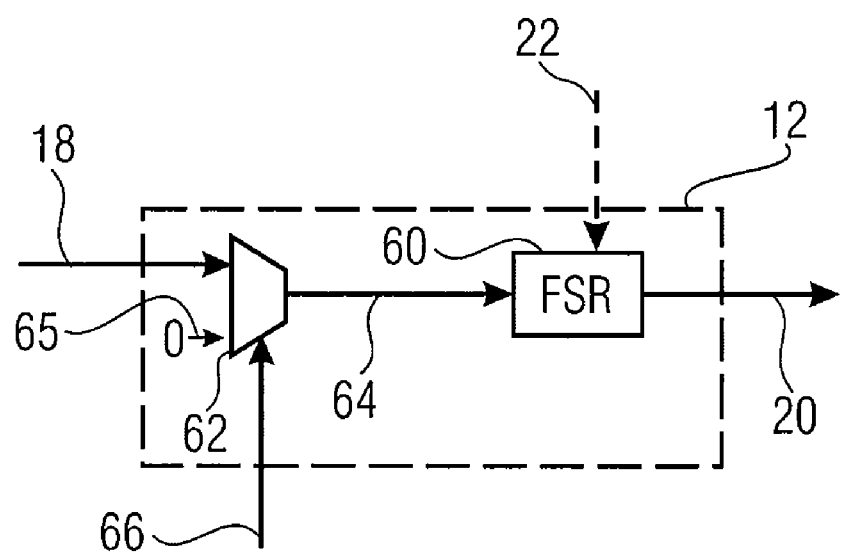
FIG. 7 is a block diagram of an embodiment for the pseudo random number generator of FIG. 2.

FIG. 7 shows an example for a pseudo random number generator as shown in FIG. 2. The pseudo random number generator 12 of FIG. 7 comprises a feedback shift register 60 and a multiplexer 62. The feedback shift register 60 is clocked by means of clock 22 and outputs, synchronously with the clock, the pseudo random number output signal 20. The feedback shift register 60 comprises an internal state that corresponds to the content of the memory cells of the feedback shift register 60. The internal state changes per clock cycle of clock 22 according to some feedback function of the feedback shift register 60. The internal state may be influenced by a signal 62 at an input of the feedback shift register 60. To this input, an output of multiplexer 62 is connected. A first input of the multiplexer 62 receives the true random number output signal 18. A second input of the multiplexer 62 receives a constant signal such as 0, as indicated in FIG. 7 for illustrative purposes. The multiplexer 62 has a control input to receive a control signal 66 from control 16. Depending on the control signal 66, the multiplexer 62 passes the true random number output number 18 or the constant signal 65 as signal 64 to the input of the feedback shift register 60. While the constant signal 65 is selected so as to leave the internal state of the feedback shift register 60 uninfluenced, the true random number output signal 18 when passed to the input of the feedback shift register 60 influences the internal state thereof, thereby increasing the amount of uncertainty within feedback shift register 60 and the quality of the pseudo random number output signal 20.

For the sake of completeness only, it is noted that the feedback shift register may be a non-linear feedback shift register or a linear feedback shift register. Further, a feedback shift register 60 of FIG. 7 may be a feedback shift register circuit being composed of more than one shift register with a feedback circuit providing for a feedback from the respective output end of each shift register to the respective input end.

In particular, the feedback shift register 60 of FIG. 7 may be a feedback shift register circuit comprising feedback shift registers connected in parallel to each other with an arithmetic combiner combining the individual feedback shift register's outputs to a common pseudo random number output signal.

Figure 8:
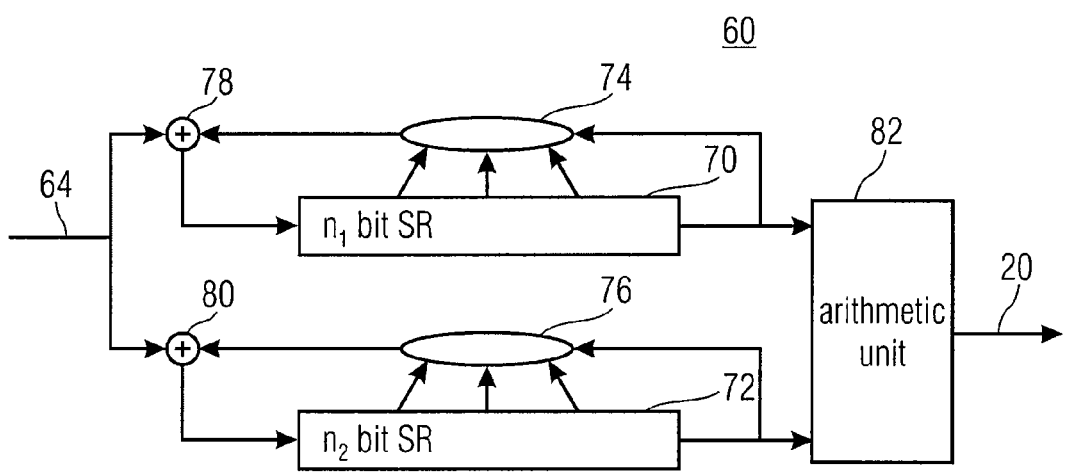
FIG. 8 is a block diagram of an embodiment for the feedback shift register of FIG. 7 according to an embodiment.

The latter possibility is shown in FIG. 8. FIG. 8 shows a feedback shift register circuit comprising a plurality of shift registers 70 and 72. Although in FIG. 8 only two shift registers are shown to be comprised by feedback shift register circuit 60, more than two shift registers may be provided. Exemplarily, both shift registers have a different number of bit positions or memory cells, i.e. $n_1 \neq n_2$. Both shift registers have an input and an output wherein the output of the shift registers 70 and 72, as well as one or several of the intermediate memory cell outputs are coupled to a respective feedback function circuit 74 and 76, respectively. Each feedback function circuit 74 and 76 combines the incoming bits according to some feedback function and outputs a feedback signal. In particular, the feedback function circuit 74 combines the output of the shift register 70 as well as intermediate memory cell contents within shift register 70 to obtain the feedback signal. An XOR gate 78 is coupled between the output of the feedback function circuit 74 and the input of shift register 70, so as to couple the feedback signal without amendments to the input of the shift register 70 as long as the signal at a further input of the logical XOR gate 78 remains at a predetermined logic value such as 0. Of course, another logic gate could be used so that the predetermined logic value could be 1. Similarly, an XOR gate 80 is coupled between the output of feedback function circuit 76 and input shift register 72. The further inputs of XOR gates 78 and 80 are coupleable with the true random number input signal 18 depending on a control signal from control 16 (see FIG. 2) wherein an example for the controllability has been provided with respect to FIG. 7.

Thus, shift register 70, feedback function circuit 74, and XOR gate 78 form a first feedback shift register whereas shift register 72, feedback function circuit 76, and XOR gate form another feedback shift register. Both feedback shift registers may be clocked by the same clock such as clock 22. During each clock cycle, the feedback function circuits 74 and 76 each generate a feedback bit which is passed to the input of the respective shift register 70 and 72, respectively. However, the feedback signal may be influenced by the true random number output signal 18, provided control 16 decides to currently seed the pseudo random number generator. Thus, in each clock cycle, the respective feedback shift register 70, 74 and 78, and 72, 76 and 80, respectively, is influenced by one bit of the true random number output signal. Thus, in consecutive seeding clock cycles, the quality of the output signal of these feedback shift registers gradually increases. In particular, the outputs of shift register 70 and 72 are connected with respective inputs of an arithmetic combination unit 82, also comprised by the feedback shift register circuit 60. The arithmetic combination unit 82 combines, per clock cycle, the incoming bits by an arithmetic function in order to output, per clock cycle, one combined bit at its output, to thus obtain the pseudo random number output signal 20.

It should be noted that the embodiments given above are merely of illustrative nature. This is especially true for FIG. 6-8. The embodiments presented therein merely serve to ease the understanding of the operation of exemplary instantiations of the respective elements in the previous Figures, such as FIG. 2. Further, the embodiments in FIG. 6 to 8 may be varied. For example, the number of bits input into comparator 52 per clock cycle in the seeding mode may exceed one. The same applies to the output of the PRNG bit sequence.

The above embodiments are able to avoid penalties and delays when using a pseudo random number generator, which result from the powering-up and the output rate of the true random number generator. A powering-up of a true random number generator is a time-consuming procedure. Further, usually, a true random number generator is slower or has a lower output rate than a pseudo random number generator. In accordance with the above embodiments, a slow true random number generator being ready after a long powering-up time may be combined with a fast pseudo random number generator in an effective way if the pseudo random number generator is commenced early with only a few true random number bits from the true random number generator, thus, making a true pseudo random number output signal available. During this time, the pseudo random number generator provides pseudo random number bits of lower quality. However, by transferring further true random number bits from the true random number generator, the amount of bytes for the pseudo random number generator 16 is increased during the operation of the pseudo random number generator, thereby successively increasing the quality of the pseudo random number output signal. As soon as the amount of true random numbers from the true random number generator is high enough, the modules, i.e., the pseudo random number generator and the true random number generator, may be decoupled and may run independent from each other.

It is further noted that the above embodiments could be modified in that the rate at which the pseudo random number output signal bits are used by the subsequent consumer circuit is restricted, depending on the ratio of the output rate of the pseudo random number generator and the true random number generator. For example, if the pseudo random number generator is x-times faster than the true random number generator, then only x/2 bits should be used according to an embodiment.

Although FIG. 8 suggests influencing the feedback signal with the true random number output signal, according to further embodiments, the influencing of the internal state of the feedback shift register takes place at some intermediate portions of the shift register nearer to the output of the feedback shift register. Further, although FIG. 1b suggests seeding the pseudo random number generator with an amount of bits of the true random number output signal equal to the case where the true random number output signal is applied to the pseudo random number generator during one continuous time interval, in the case of the intermediate seeding steps, the amount of true random number output signal bits with which the pseudo random number generator is seeded could be increased relative to the seeding in one continuous time interval, thereby increasing $Q_0'$ or adapting $Q_0'$ to $Q_0$. For example, in the case of a feedback shift register having n memory cells and a period length of between $2^{n-1}$ and $2^n$, the increase of the quality of the pseudo random number output signal could be performed in a number I of steps with, in total, coupling the pseudo random number generator with $n_i$ bits of the true random number output signal of the true random number generator per step i of the plurality of steps, wherein $$\sum_{i=1}^{I} n_i > n$$

and i>1.

Depending on an actual implementation, the above embodiments can be implemented in hardware or in software. Therefore, they also relate to a computer program, which can be stored on a computer-readable medium such as a CD, a disk or any other data carrier. These embodiments define, therefore, also a computer program having a program code which, when executed on a computer, performs the above methods described in connection with the above figures.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A system comprising:
   a pseudo random number generator having n memory cells and a period length between $2^{n-1}$ and $2^n$;
   a control circuit being configured to, from a power-up of the true random number generator on, increase a quality of a pseudo random number output signal of the pseudo random number generator by coupling the pseudo random number generator with $n_i$<n bits of a true random number output signal of a true random number generator per step i of the plurality of steps, and operate the pseudo random number generator in a free-running mode in which the pseudo random number generator is decoupled from the true random number output signal, so that a temporal progression of a total number of bits of the true random number output signal coupled to the pseudo random number generator increases stepwise; and
   a consumer circuit being configured to use the pseudo random number output signal already between the steps i<I, with $$\sum_{i=1}^{I-1} n_i < n < \sum_{i=1}^{I} n_i.$$

2. The system according to claim 1 wherein the consumer circuit comprises a cryptographic circuit being configured to use the pseudo random number output signal after the increase.

3. The system according to claim 2, wherein the consumer circuit comprises a non-cryptographic unit being configured to use the pseudo random number output signal before the increase.

4. The system according to claim 1, wherein the control circuit is configured to increase the quality of the pseudo random number output signal in a number I of steps with coupling the pseudo random number generator with $n_i$ bits of the true random number output signal of the true random number generator per step i of the plurality of steps, wherein $$\sum_{i=1}^{I} n_i > n$$

and i>1.

5. The system according to claim 1, further comprising the true random number generator, the true random number generator comprising a second noise source and a compressor coupled between the physical noise source and the pseudo random number generator.

6. The system according to claim 1, wherein the pseudo random number generator, the control circuit and the consumer circuit are configured such that a time instant exists after the increase, at which the amount of true random number output signal coupled to the pseudo random number generator for increasing the quality of the pseudo random number output signal until this time instant is lower than an amount of pseudo random number output signal used by the consumer circuit until the time instant.

7. A system comprising:
   a pseudo random number generator;
   a control circuit being configured to increase a quality of a pseudo random number output signal of the pseudo random number generator by coupling the pseudo random number generator with a true random number output signal of a true random number generator; and a consumer circuit being configured to use the pseudo random number output signal before and after the increase, wherein the consumer circuit comprises a central processing unit being configured to:

receive a request to perform a task requiring an associated quality;

compare the associated quality required with a current quality of the pseudo random number output signal; and perform the task using the pseudo random number output signal depending on the comparison.

8. The system according to claim 7, wherein the central processing unit is coupled with the control circuit to receive a signal therefrom indicating the current quality of the pseudo random number output signal.

9. The system according to claim 7, wherein the central processing unit is configured to derive the current quality from a time period or a number of clock cycles passed since a power-up of the true random number generator.

10. An apparatus for controlling a pseudo random number generator and a consumer circuit coupled thereto, comprising:

means for increasing a quality of a pseudo random number output signal of the pseudo random number generator by coupling the pseudo random number generator with a true random number output signal of a true random number generator; and means for causing the consumer circuit to use the pseudo random number output signal before and after the increase of the quality of the pseudo random number output signal, wherein the means for causing comprises:

means for receiving a request for performing a task requiring an associated quality;

means for comparing the associated quality required with a current quality of the pseudo random number output signal; and means for performing the task using the pseudo random number output signal depending on the comparison.

11. The apparatus according to claim 10, wherein the means for comparing is configured to receive a signal from the means of increasing, the signal indicating a current quality of the pseudo random number output signal.

12. The apparatus according to claim 10, wherein the means for comparing is configured to derive the current quality based on the time period or a number of clock cycles passed since a power-up of the true random number generator.

13. The apparatus according to claim 10, wherein the pseudo random number generator has n memory cells and a period length of $2^{n-1}$ and $2^n$ and the means for increasing is configured to increase the quality of the pseudo random number output signal in a number I of steps with coupling the pseudo random number generator with $n_i$ bits of the true random number output signal of the true random number generator per step i of the plurality of steps, wherein $$\sum_{i=1}^{I} n_i > n$$

and i>1.

14. The apparatus according to claim 10, wherein the apparatus further comprises the true random number generator and the pseudo random number generator, the true random number generator comprising a physical noise source and a compressor coupled between the physical noise source and the pseudo random number generator.

15. The apparatus according to claim 10, wherein the means for increasing and the means for causing are configured such that there exists a time instant after the increase at which the amount of true random number output signal coupled to the pseudo random number generator for increasing the quality of the pseudo random number output signal until this time instant is lower than an amount of pseudo random number output signal used by the consumer circuit until this time instant.

16. A method for controlling a pseudo random number generator and a consumer circuit coupled thereto, comprising:

increasing a quality of a pseudo random number output signal of the pseudo random number generator by coupling the pseudo random number generator with a true random number output signal of a true random number generator; and causing the consumer circuit to use the pseudo random number output signal before and after the increase of the quality of the pseudo random number output signal, wherein the causing comprises:

receiving a request for performing a task requiring an associated quality;

comparing the associated quality required with a current quality of the pseudo random number output signal; and performing the task using the pseudo random number output signal depending on the comparison.

17. The method according to claim 16, wherein the comparing comprises receiving a signal from the means of increasing, the signal indicating a current quality of the pseudo random number output signal.

18. The method according to claim 16, wherein the comparing comprises deriving the current quality based on the time period or a number of clock cycles passed since a power-up of the true random number generator.

19. The method according to claim 16, wherein the pseudo random number generator has n memory cells and a period length of $2^{n-1}$ and $2^n$ and the increasing comprises increasing the quality of the pseudo random number output signal in a number I of steps with coupling the pseudo random number generator with $n_i$ bits of the true random number output signal of the true random number generator per step i of the plurality of steps, wherein $$\sum_{i=1}^{I} n_i > n$$

and i>1.

20. The method according to claim 16, further comprising generating true random number output signal by means of a true random number generator comprising a physical noise source and a compressor coupled between the physical noise source and the pseudo random number generator.

21. The method according to claim 16, wherein the increasing and the causing are performed such that there exists a time instant after the increase at which the amount of true random number output signal coupled to the pseudo random number generator for increasing the quality of the pseudo random number output signal until this time instant is lower than an amount of pseudo random number output signal used by the consumer circuit until this time instant.

22. A computer program having instructions for performing, when running on a computer, a method for controlling a pseudo random number generator and a consumer circuit coupled thereto, the pseudo random number generator having n memory cells and a period length between $2^{n-1}$ and $2^n$, the method comprising from a power-up of the true random number generator on, increasing a quality of a pseudo random number output signal of the pseudo random number generator by coupling the pseudo random number generator with $n_i < n$ bits of a true random number output signal of a true random number generator per step i of the plurality of steps, and operate the pseudo random number generator in a free-running mode in which the pseudo random number generator is decoupled from the true random number output signal, so that a temporal progression of a total number of bits of the true random number output signal coupled to the pseudo random number generator increases stepwise; and causing the consumer circuit to use the pseudo random number output signal already between the steps i<I, with $$\sum_{i=1}^{I-1} n_i < n < \sum_{i=1}^{I} n_i.$$

23. A computer-readable medium having stored thereon a program having instructions for performing, when running on a computer, a method for controlling a pseudo random number generator and a consumer circuit coupled thereto, the pseudo random number generator having n memory cells and a period length between $2^{n-1}$ and $2^n$, the method comprising from a power-up of the true random number generator on, increasing a quality of a pseudo random number output signal of the pseudo random number generator by coupling the pseudo random number generator with $n_i < n$ bits of a true random number output signal of a true random number generator per step i of the plurality of steps, and operate the pseudo random number generator in a free-running mode in which the pseudo random number generator is decoupled from the true random number output signal, so that a temporal progression of a total number of bits of the true random number output signal coupled to the pseudo random number generator increases stepwise; and causing the consumer circuit to use the pseudo random number output signal already between the steps i<I, with $$\sum_{i=1}^{I-1} n_i < n < \sum_{i=1}^{I} n_i.$$

24. A system comprising:

a having n memory cells and a period length between $2^{n-1}$ and $2^n$;

a control circuit being configured to, from a power-up of the true random number generator on, increase a quality of a pseudo random number output signal of the pseudo random number generator by coupling the pseudo random number generator with $n_i < n$ bits of a true random number output signal of a true random number generator per, step i of the plurality of steps, and operate the pseudo random number generator in a free-running mode in which the pseudo random number generator is decoupled from the true random number output signal before and after the couplings at steps i, so that a temporal progression of a total number of bits of the true random number output signal coupled to the pseudo random number generator increases stepwise, and to stop increasing the quality of the pseudo random number output signal at some time instant by continuing to operate the pseudo random number generator in the free-running mode from that time instant on; and a consumer circuit being configured to use the pseudo random number output signal before and after the time instant.

25. A method for controlling a pseudo random number generator and a consumer circuit coupled thereto, the pseudo random number generator having n memory cells and a period length between $2^{n-1}$ and $2^n$, the method comprising from a power-up of the true random number generator on, increasing a quality of a pseudo random number output signal of the pseudo random number generator by coupling the pseudo random number generator with $n_i < n$ bits of a true random number output signal of a true random number generator per step i of the plurality of steps, and operate the pseudo random number generator in a free-running mode in which the pseudo random number generator is decoupled from the true random number output signal, so that a temporal progression of a total number of bits of the true random number output signal coupled to the pseudo random number generator increases stepwise; and causing the consumer circuit to use the pseudo random number output signal already between the steps i<I, with $$\sum_{i=1}^{I-1} n_i < n < \sum_{i=1}^{I} n_i.$$

* * * * *